US012562528B2

(12) United States Patent
Hsueh et al.

(10) Patent No.: US 12,562,528 B2
(45) Date of Patent: Feb. 24, 2026

(54) OUTLET MODULE MOUNTING MECHANISM AND POWER DISTRIBUTION UNIT INCORPORATING THE SAME

(71) Applicant: Legrand DPC, LLC, Reno, NV (US)

(72) Inventors: Thomas Hsueh, Taipei (TW); Alex Lee, New Taipei (TW); Sam Liu, New Taipei (TW); James P. Maskaly, Reno, NV (US)

(73) Assignee: LEGRAND DPC, LLC, Reno, NV (US)

( * ) Notice: Subject to any disclaimer, the term of this patent is extended or adjusted under 35 U.S.C. 154(b) by 549 days.

(21) Appl. No.: 17/975,438

(22) Filed: Oct. 27, 2022

(65) Prior Publication Data

US 2024/0145991 A1 May 2, 2024

(51) Int. Cl.
*H01R 13/629* (2006.01)
*H01R 13/518* (2006.01)
*H01R 13/627* (2006.01)

(52) U.S. Cl.
CPC ..... *H01R 13/62933* (2013.01); *H01R 13/518* (2013.01); *H01R 13/6275* (2013.01)

(58) Field of Classification Search
None
See application file for complete search history.

(56) References Cited

U.S. PATENT DOCUMENTS 4,603,239 A * 7/1986 Ishii .................... E05B 47/0607 235/22
11,196,212 B2 12/2021 Ramsey et al.
2015/0155647 A1* 6/2015 Ashikawa ............... B60R 25/00 439/133
2019/0148881 A1* 5/2019 Linnerbauer ........... F16B 5/121 439/352
2022/0209453 A1* 6/2022 Probert ................ H01R 13/422

* cited by examiner

*Primary Examiner* — Oscar C Jimenez
(74) *Attorney, Agent, or Firm* — Michael Henson; Maynard Nexsen PC

(57) ABSTRACT

An outlet module mounting mechanism for use with a power distribution unit including: a bracket attachable to an outlet module; a latch movably coupled to the bracket, wherein the latch has a proximal end portion and a distal end portion; a link coupled to the proximal end portion of the latch; and a plunger connected to the link and movable between a released position and a latched position. When the plunger is moved to the latched position the plunger moves the link away from a front side of the outlet module such that the distal end portion of the at least one latch moves toward the front side of the outlet module to engage a corresponding wall of the housing thereby securing the outlet module to the housing.

26 Claims, 8 Drawing Sheets

OUTLET MODULE MOUNTING MECHANISM AND POWER DISTRIBUTION UNIT INCORPORATING THE SAME

TECHNICAL FIELD

The present disclosure is generally directed to outlet modules, and particularly modules that are mounted in a power distribution unit (PDU). More specifically the disclosure is directed to mounting mechanisms to retain an outlet module in a PDU housing.

BACKGROUND

A conventional PDU is an assembly of electrical outlets (also called receptacles) that receive electrical power from a source and distribute the electrical power to one or more separate electronic appliances. Each such PDU assembly has a power input that receives power from one or more power sources, and power outlets that may be used to provide power to one or more electronic appliances. PDUs are used in many applications and settings such as, for example, in or on electronic equipment racks.

Current PDUs can include an outlet module with a front panel to which the components of the PDU are attached. The components attached to the front panel can include e.g., outlets. The entire module is inserted into a u-shaped housing. In order to retain the module in the housing the module can include plastic latch features positioned along the sides of the module that engage the u-shaped housing. These latch features can make it difficult to remove the module from the housing as they are typically designed for one time assembly. Furthermore, the plastic latch features can be damaged during assembly and/or disassembly of the PDU. Conventional latches also add complexity, and therefore cost, to the tooling used to injection mold the module components.

SUMMARY

In some aspects, the techniques described herein relate to an outlet module mounting mechanism for use with a power distribution unit (PDU) having an associated PDU housing, including: a bracket attachable to an outlet module; at least one latch movably coupled to the bracket, wherein said at least one latch has a proximal end portion and a distal end portion; a link movably coupled to the proximal end portion of said at least one latch; and a plunger connected to the link and movable between a released position and a latched position, wherein when the plunger is moved to the latched position the plunger moves the link away from a front side of the outlet module such that the distal end portion of the at least one latch moves toward the front side of the outlet module to engage a corresponding wall of the PDU housing thereby securing the outlet module to the PDU housing, and when the plunger is moved to the released position the plunger moves the link toward the front side of the outlet module such that the distal end portion of the at least one latch moves away from the front side of the outlet module to disengage the corresponding wall thereby releasing the outlet module from the PDU housing and allowing removal of the outlet module from the PDU.

In some aspects, the techniques described herein relate to a mechanism, wherein the at least one latch includes a pair of latches each pivotably coupled to the bracket, and wherein the link is positioned between the pair of latches and pivotably coupled to the proximal end portion of each of the latches.

In some aspects, the techniques described herein relate to a mechanism, wherein the proximal end portion of each latch includes a slot and the link includes a pair of pins each configured to engage the slot of a corresponding latch.

In some aspects, the techniques described herein relate to a mechanism, wherein the proximal end of each latch includes a clevis.

In some aspects, the techniques described herein relate to a mechanism, wherein when the plunger is moved to the latched position the plunger moves the link away from a front panel of the outlet module such that the distal end portion of the at least one latch moves toward the front panel, and when the plunger is moved to the released position the plunger moves the link toward the front panel such that the distal end portion of the at least one latch moves away from the front panel.

In some aspects, the techniques described herein relate to a mechanism, wherein the plunger includes first and second threaded portions, wherein the first threaded portion engages mating threads disposed in the bracket, and wherein the plunger extends through the link and the second threaded portion engages a mating fastener retained in the link.

In some aspects, the techniques described herein relate to a mechanism, further including a guide pin extending through a portion of the bracket and engaged with the second threaded portion, and a resilient member positioned between the link and the portion of the bracket.

In some aspects, the techniques described herein relate to a mechanism, wherein the at least one latch pivots about a corresponding pivot pin attached to the bracket.

In some aspects, the techniques described herein relate to a mechanism, wherein the bracket includes a pair of guide slots and the link includes a pair of guide features slidably mated with the guide slots.

In some aspects, the techniques described herein relate to a mechanism, wherein the bracket includes one or more posts positioned to support a printed circuit board.

In some aspects, the techniques described herein relate to an outlet module for use with a power distribution unit (PDU) having an associated PDU housing, the outlet module including: an outlet module panel; multiple outlets carried by the panel; and at least one outlet module mounting mechanism, including: at least one latch having a proximal end portion and a distal end portion; and an actuator linked to the at least one latch and movable between a released position and a latched position, wherein when the actuator is moved to the latched position the actuator causes the distal end portion of the at least one latch to move toward the panel to engage a corresponding wall of the PDU housing thereby securing the outlet module to the PDU housing, and when the actuator is moved to the released position the actuator causes the distal end portion of the at least one latch to move away from the panel and disengage the corresponding wall thereby releasing the outlet module from the PDU housing and allowing removal of the outlet module from the PDU.

In some aspects, the techniques described herein relate to an outlet module, wherein the at least one outlet module mounting mechanism further includes a bracket attached to the outlet module panel and wherein the at least one latch includes a pair of latches each pivotably coupled to the bracket.

In some aspects, the techniques described herein relate to an outlet module, wherein the at least one outlet module mounting mechanism further includes a link connected to the actuator and pivotably coupled to the proximal end portion of each of the latches.

In some aspects, the techniques described herein relate to an outlet module, wherein the actuator includes a plunger including first and second threaded portions, wherein the first threaded portion engages mating threads disposed in the bracket, and wherein the plunger extends through the link and the second threaded portion engages a mating fastener retained in the link.

In some aspects, the techniques described herein relate to an outlet module, further including a guide pin extending through a portion of the bracket and engaged with the second threaded portion.

In some aspects, the techniques described herein relate to an outlet module, wherein the proximal end portion of each latch includes a slot and the link includes a pair of pins each configured to engage the slot of a corresponding latch.

In some aspects, the techniques described herein relate to an outlet module, wherein the bracket includes a pair of guide slots and the link includes a pair of guide features slidably mated with the guide slots.

In some aspects, the techniques described herein relate to an outlet module, further including a printed circuit board, and wherein the bracket includes one or more posts positioned to support the printed circuit board.

In some aspects, the techniques described herein relate to a power distribution unit, including: a housing; and at least one outlet module located at least partially within the housing, the at least one outlet module including: an outlet module panel mated to the housing; multiple outlets carried by the panel; and at least one outlet module mounting mechanism, including: at least one latch having a proximal end portion and a distal end portion; and an actuator linked to the at least one latch and movable between a released position and a latched position, wherein when the actuator is moved to the latched position the actuator causes the distal end portion of the at least one latch to move toward the panel to engage a corresponding wall of the housing thereby securing the outlet module to the housing, and when the actuator is moved to the released position the actuator causes the distal end portion of the at least one latch to move away from the panel to disengage the corresponding sidewall thereby releasing the outlet module from the housing and allowing removal of the outlet module from the housing.

In some aspects, the techniques described herein relate to a power distribution unit, wherein the housing includes longitudinally extending rails against which the at least one latch engages the wall of the housing.

In some aspects, the techniques described herein relate to a power distribution unit, wherein each rail includes a groove extending along its length, and wherein the panel includes flanges that engage a corresponding groove.

In some aspects, the techniques described herein relate to a power distribution unit, wherein the at least one outlet module mounting mechanism further includes a bracket attached to the outlet module panel and wherein the at least one latch includes a pair of latches each pivotably coupled to the bracket.

In some aspects, the techniques described herein relate to a power distribution unit, wherein the at least one outlet module mounting mechanism further includes a link connected to the actuator and pivotably coupled to the proximal end portion of each of the latches.

In some aspects, the techniques described herein relate to a power distribution unit, wherein the actuator includes a plunger including first and second threaded portions, wherein the first threaded portion engages mating threads disposed in the bracket, and wherein the plunger extends through the link and the second threaded portion engages a mating fastener retained in the link.

In some aspects, the techniques described herein relate to a power distribution unit, further including a guide pin extending through a portion of the bracket and engaged with the second threaded portion, and a resilient member positioned around the guide pin and between the link and the portion of the bracket.

In some aspects, the techniques described herein relate to a power distribution unit, wherein the proximal end portion of each latch includes a slot and the link includes a pair of pins each configured to engage the slot of the corresponding latch.

In some aspects, the techniques described herein relate to a method of removably attaching a module to a housing. The method can comprise configuring the module in a first state wherein the module can be inserted at least partially into the housing; and configuring the module in a second state wherein the module is secured to the housing where the module engages the enclosure to resists removal.

In some aspects, the techniques described herein relate to a method, wherein configuring the module in the second state comprises moving an actuator of the module into the module and retaining the actuator therein. In some aspects, the techniques described herein relate to a method, wherein the actuator causes one or more components carried by the module to engage the housing. In some aspects, the techniques described herein relate to a method, further comprising biasing the module toward the first state. In some aspects, the techniques described herein relate to a method, wherein the module is an outlet module comprising one or more outlets.

The foregoing has outlined rather broadly the features and technical advantages of examples according to the disclosure in order that the detailed description that follows may be better understood. Additional features and advantages will be described hereinafter. The concepts and specific examples disclosed herein may be readily used as a basis for modifying or designing other structures for carrying out the same or similar purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present technology may be realized by reference to the following drawings. In the appended figures, similar components or features may have the same reference label.

DETAILED DESCRIPTION

This description provides examples, and is not intended to unnecessarily limit the scope, applicability or configuration of the disclosed technology. Rather, the ensuing description will provide those skilled in the art with an enabling description for implementing embodiments of the disclosed technology. Various changes may be made in the function and arrangement of elements. Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Figure 1:
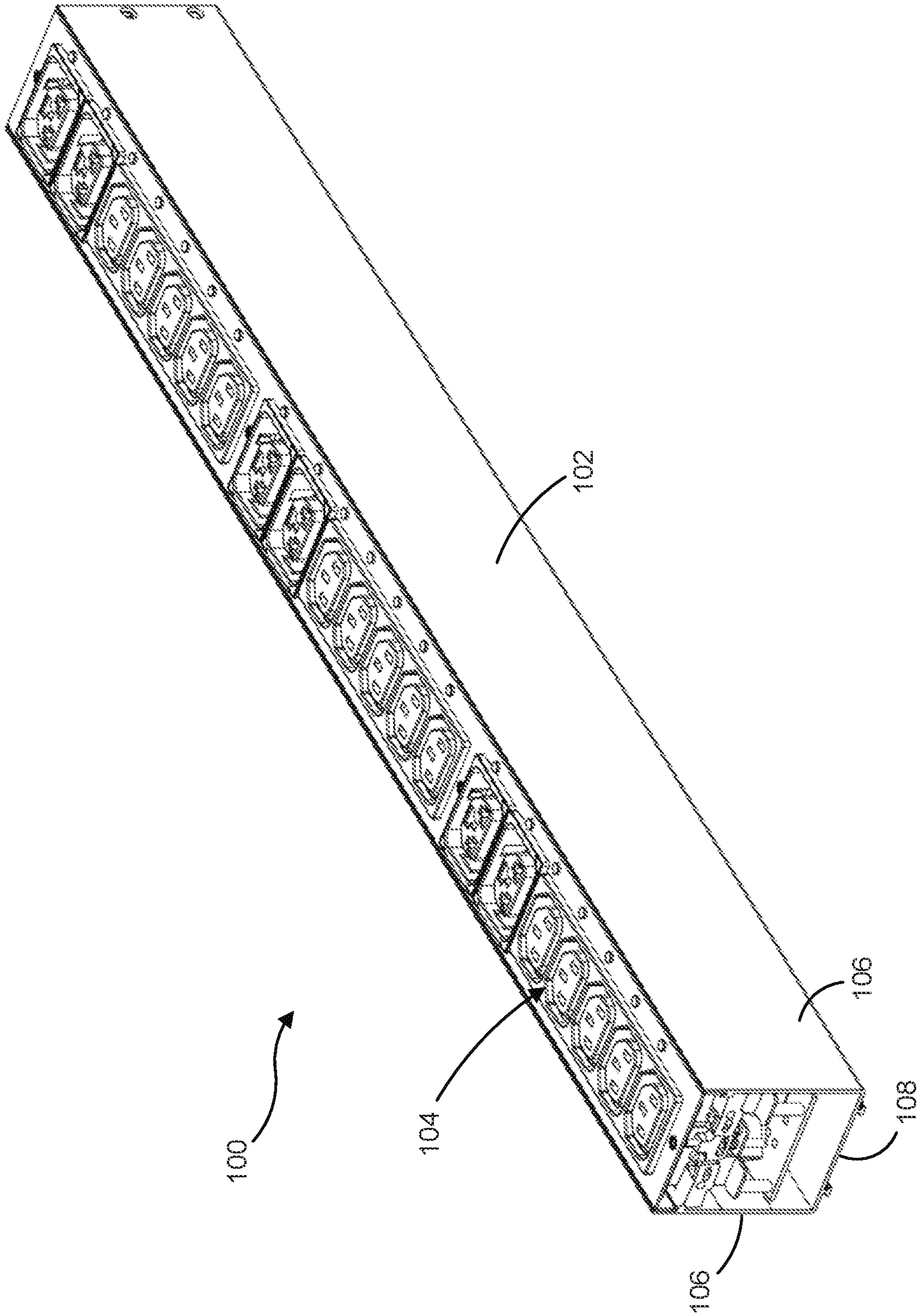
FIG. 1 is an illustration of a power distribution unit incorporating outlet module mounting mechanisms in accordance with some embodiments of the disclosed technology.

FIG. 1 is an illustration of a representative PDU 100 of an embodiment that includes various features of the present disclosure. The PDU 100 includes a PDU housing 102 configured to receive a power input which may be connected to an external power source. The PDU 100 according to this embodiment includes housing 102 that is vertically mountable in an equipment rack, although it will be understood that other form factors may be used, such as a horizontally mountable housing. An outlet module 104 may be located at least partially within the housing 102. In some embodiments, the housing 102 is a u-shaped housing including a pair of longitudinally extending sidewalls 106 and a back wall 108 extending therebetween. Although the embodiments described herein are presented in the context of PDUs, the disclosed technology can be used with any enclosure where components (e.g., panel and housing) need to be secured together.

Figure 2:
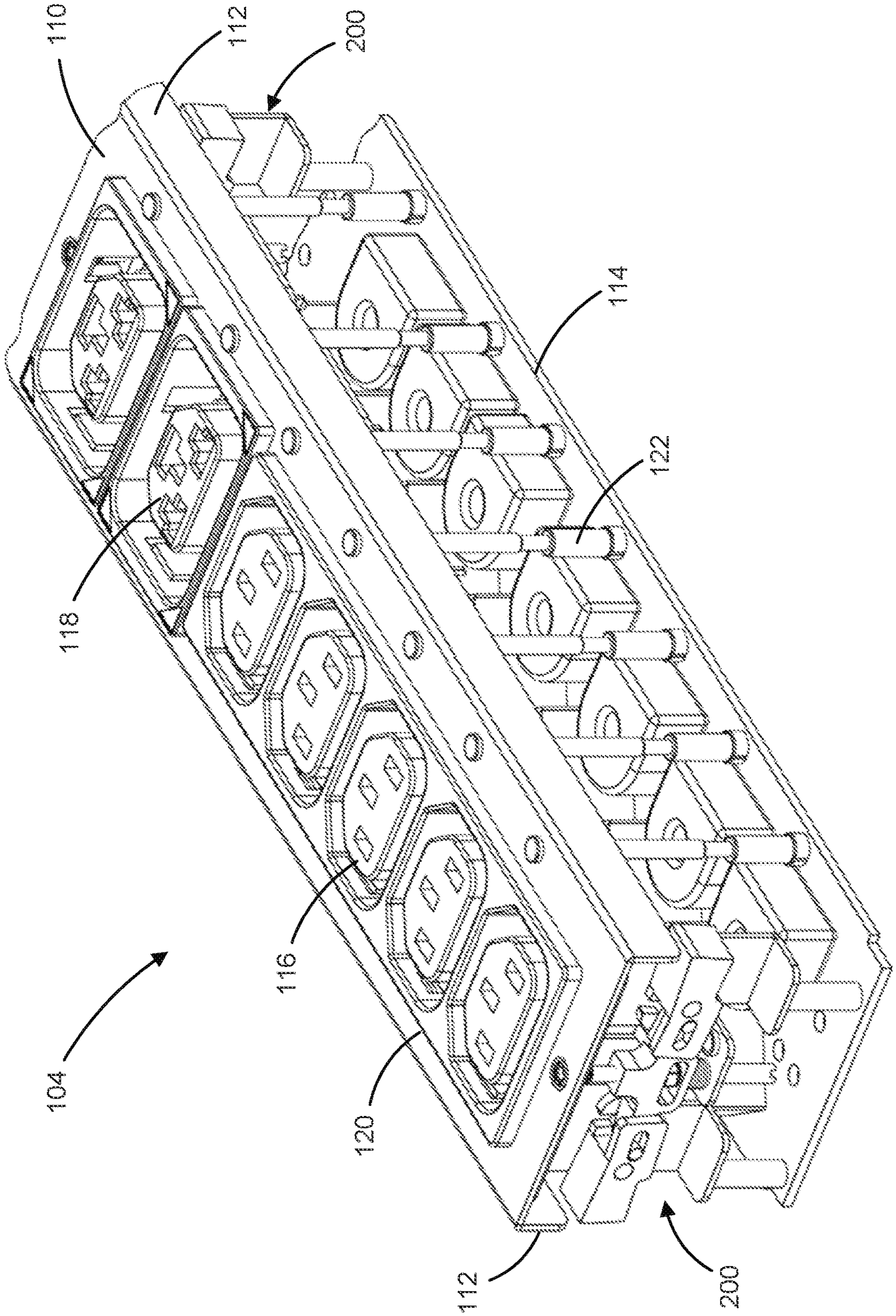
FIG. 2 is a partial isometric view of the outlet module shown in FIG. 1.

As show in FIG. 2, the outlet module 104 can include a front panel 110 having longitudinally extending opposed flanges 112. The front panel 110 carries multiple outlets 116, 118. In some embodiments, the outlet module 104 can include various combinations of C13, C19, combination outlets and/or other suitable outlet types. The module can include any suitable number of outlets arranged in any suitable orientation, pattern, and/or array. For example, outlet module 104 can include five C13 outlets 116 and two combination outlets 118, as shown. In some embodiments, the outlets can be in the form of a molded array 120 of outlets, such as C13 outlets 116. Additional suitable outlets, outlet arrays, and modules are described in U.S. Pat. No. 11,196,212, issued Dec. 7, 2021, and entitled LOCKING COMBINATION OUTLET MODULE AND POWER DISTRIBUTION UNIT INCORPORATING THE SAME, the disclosure of which is incorporated herein by reference in its entirety. The outlet module 104 can include multiple mounting mechanisms 200 configured to removably secure the outlet module 104 to the PDU housing 102.

In some embodiments, the outlet module 104 can include light pipes 122 extending from a printed circuit board (PCB) 114 and into a corresponding opening in the front panel 110. The light pipes 122 can comprise a light conducting plastic material to transfer light from a light emitting diode (not shown) on the PCB to the top of the module adjacent each outlet. This arrangement can be used to indicate the status of the outlets (e.g., on or off).

Figure 3A:
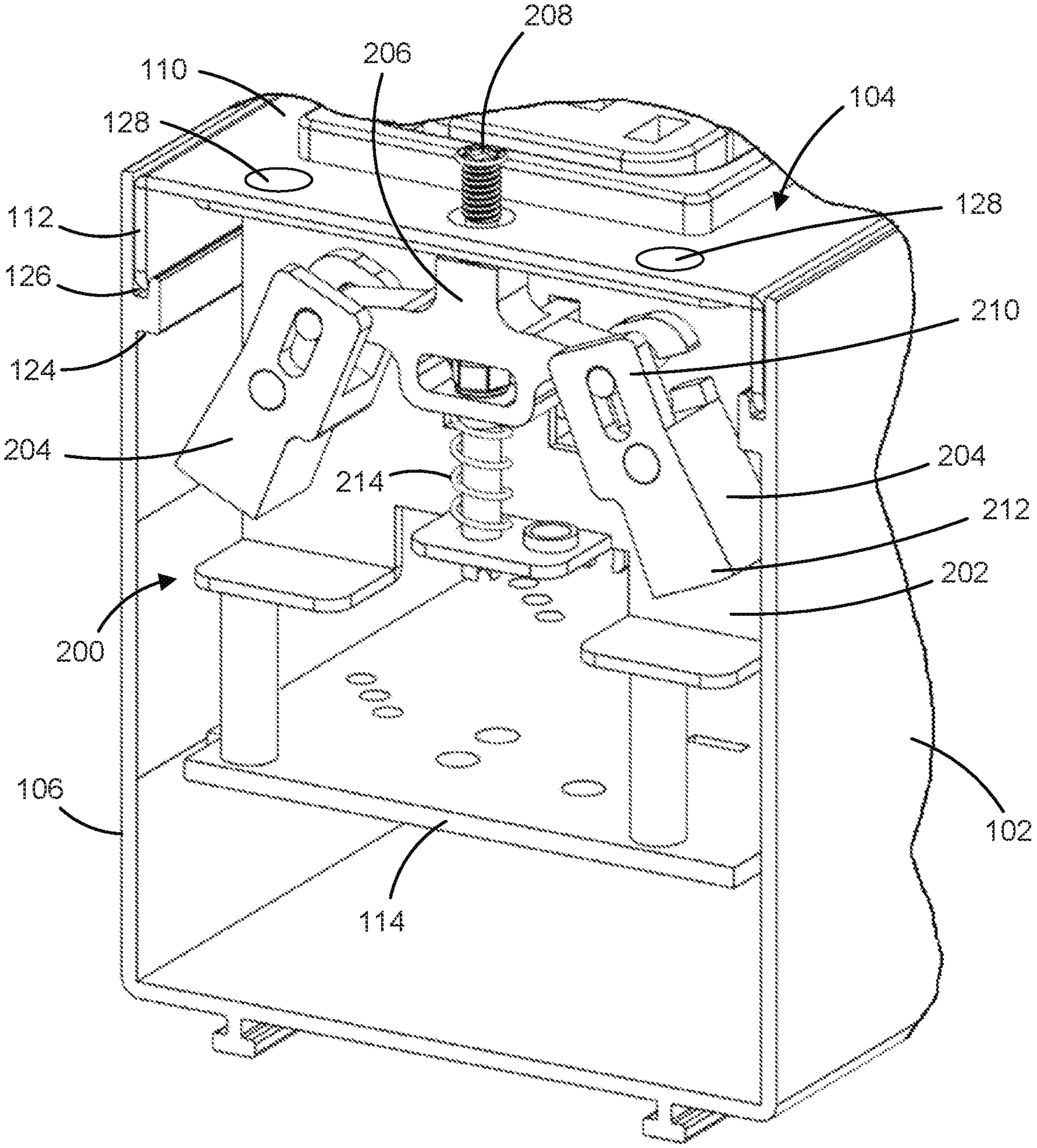
FIG. 3A is an isometric view of the outlet module mounting mechanism in a released position.

As shown in FIG. 3A, the housing sidewalls 106 include longitudinally extending rails 124 with corresponding grooves 126 extending along their lengths. Each of the front panel flanges 112 fit into the housing 102 and engage a corresponding groove 126. In some embodiments, the mounting mechanism 200 includes a bracket 202 that is attached to the front panel 110. The bracket 202 can be attached to the front panel 110 with rivets 128 or other suitable fasteners or spot welds, for example. The mounting mechanism 200 also includes a pair of latches 204 each pivotably coupled to the bracket 202. A link 206 can be positioned between the pair of latches 204 and pivotably coupled to a proximal end portion 210 of each of the latches 204. An actuator, such as plunger 208, is connected to the link 206 and movable between a released position (FIG. 3A) and a latched position (FIG. 3B).

When the plunger 208 is moved to the released position (FIG. 3A), the plunger 208 moves the link 206 toward the front panel 110. In some embodiments, a resilient member, such as compression spring 214, is positioned between the link 206 and a portion of bracket 202 to urge the link 206 toward the released position. As the link 206 moves toward the front panel 110 the distal end portions 212 of the latches 204 each move (e.g., pivot) away from the front panel 110 such that they are disengaged from the corresponding sidewall 106 whereby the outlet module 104 can be inserted into or removed from the housing 102.

Figure 3B:
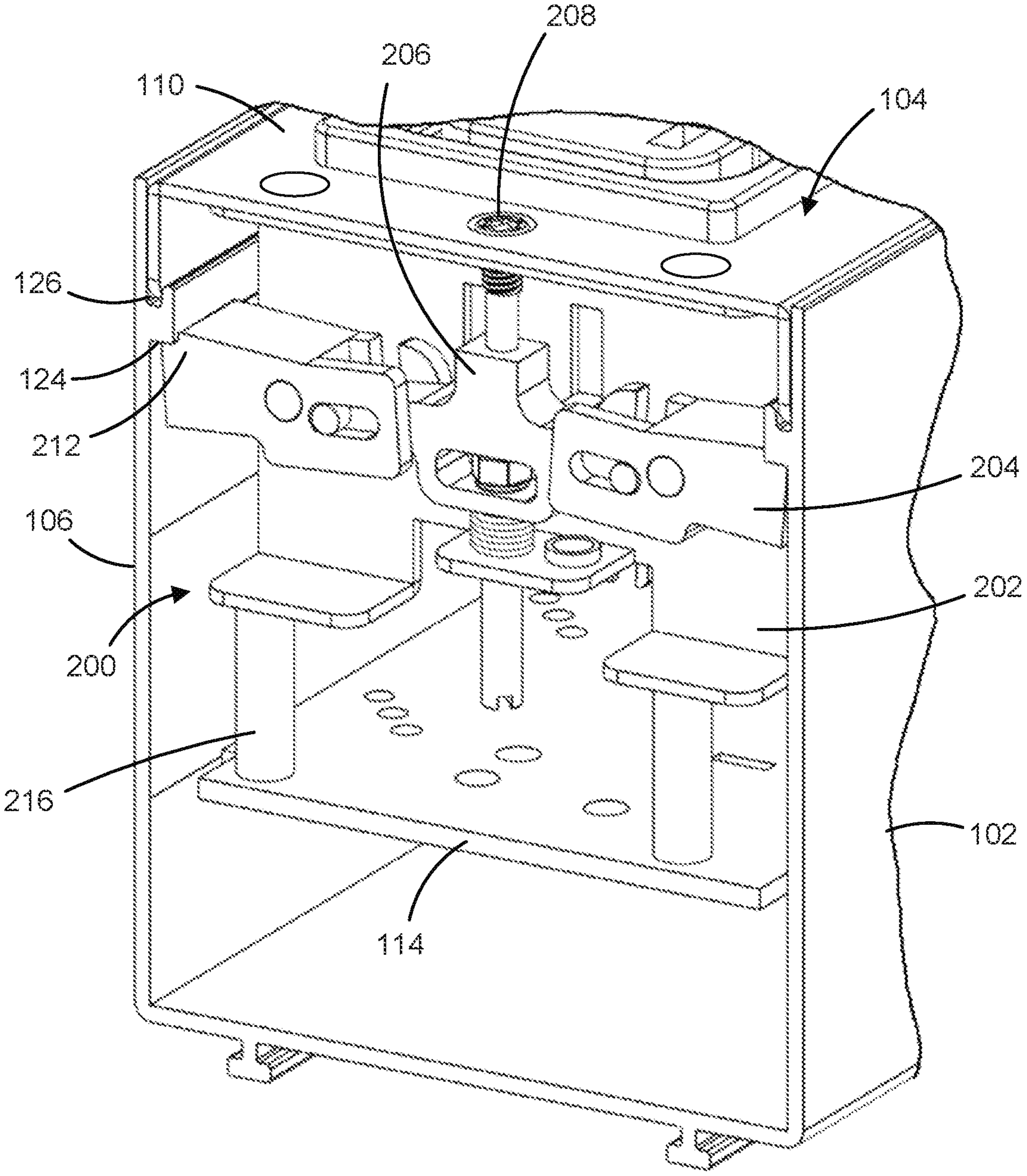
FIG. 3B is an isometric view of the outlet module mounting mechanism in a latched position.

With reference to FIG. 3B, when the plunger 208 is moved to the latched position the plunger 208 moves the link 206 away from the front panel 110 such that the distal end portions 212 of the latches 204 each move (e.g., pivot) toward the front panel 110 and engage a corresponding sidewall 106 thereby securing the outlet module to the housing 102. In some embodiments, the distal portions 212 of the latches 204 confront a surface of the rail 124 opposite the groove 126. In some embodiments, the mounting mechanism bracket 202 includes one or more posts 216 positioned to support the PCB 114. The PCB 114 can be attached to the posts 216 with suitable fasteners, such as screws (not shown).

Figure 4B:
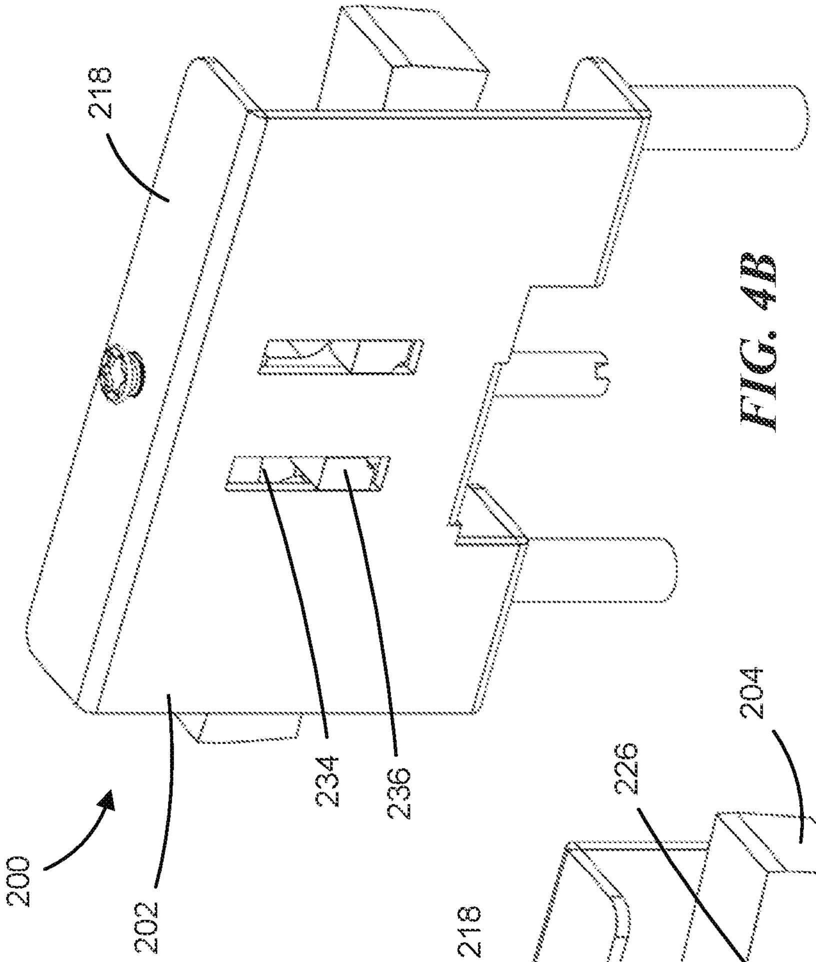
FIG. 4B is an isometric view of the mounting mechanism, as viewed from the back.
Figure 4A:
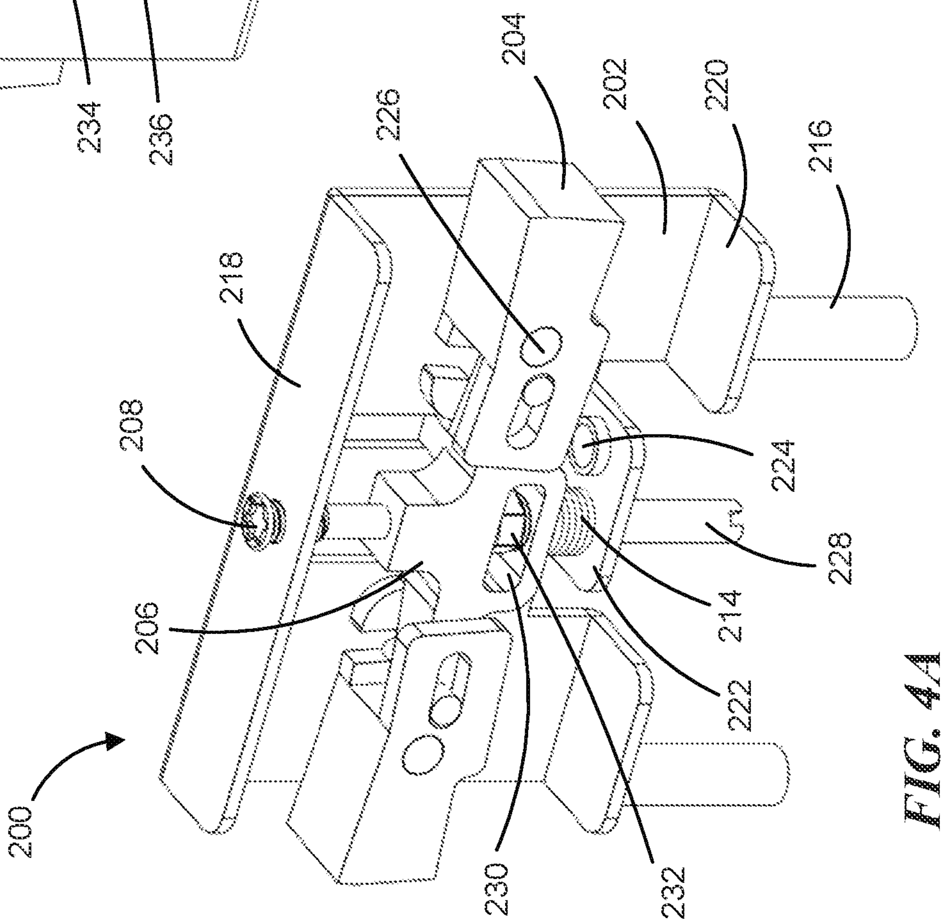
FIG. 4A is an isometric view of the mounting mechanism, as viewed from the front.

As shown in FIG. 4A, the bracket 202 can include a mounting flange 218 that is attached to the front panel 110. The plunger 208 extends through the mounting flange 218 as well as the front panel 110. The bracket 202 can also include PCB mounting flanges 220 configured to carry the PCB 114 directly or via posts 216, as shown. The bracket 202 also includes a guide flange 222. The compression spring 214 is positioned between the guide flange 222 and the link 206. In some embodiments, a guide pin 228 extends through the guide flange 222, the spring 214, and engages a threaded portion of the plunger 208. In some embodiments, the guide flange 222 includes a grounding boss 224. The latches 204 each pivot about a corresponding pivot pin 226 attached to the bracket 202. In some embodiments, the PCB mounting posts 216, the ground boss 224, and the pivot pins 226 can comprise self-clinching fasteners, such as PEM® fasteners. Also shown in FIG. 4A, the plunger 208 extends through the link 206 and engages a mating fastener, e.g., self-locking nut 232 that is retained in an opening 230 formed in the link 206. With reference to FIG. 4B, the bracket 202 includes a pair of guide slots 234 and the link 206 includes a pair of guide features 236 slidably mated with the guide slots 234.

Figure 5:
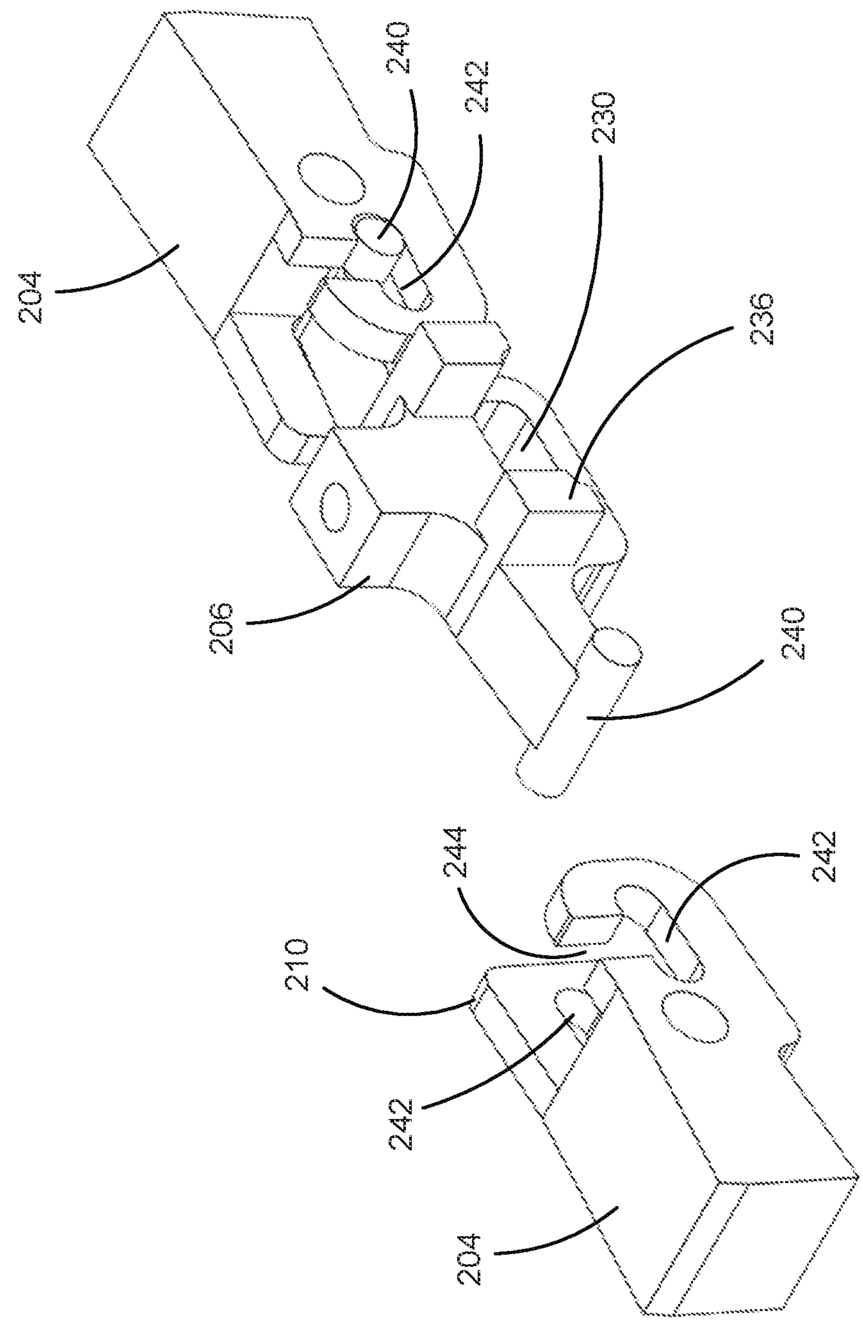
FIG. 5 is an isometric view of the mounting mechanism latches according to some embodiments of the disclosed technology.

As shown in FIG. 5, the proximal end portion 210 of each latch 204 can be in the form of a clevis including a slot 242 formed in each arm of the clevis. The link 206 includes a pair of pins 240 each configured to engage the slots 242 of a corresponding latch 204. In some embodiments, one arm of each clevis can include a notch 244 intersecting the slot 242 to facilitate assembly of the link pins 240 into the slots 242 of the latches 204.

Figure 6:
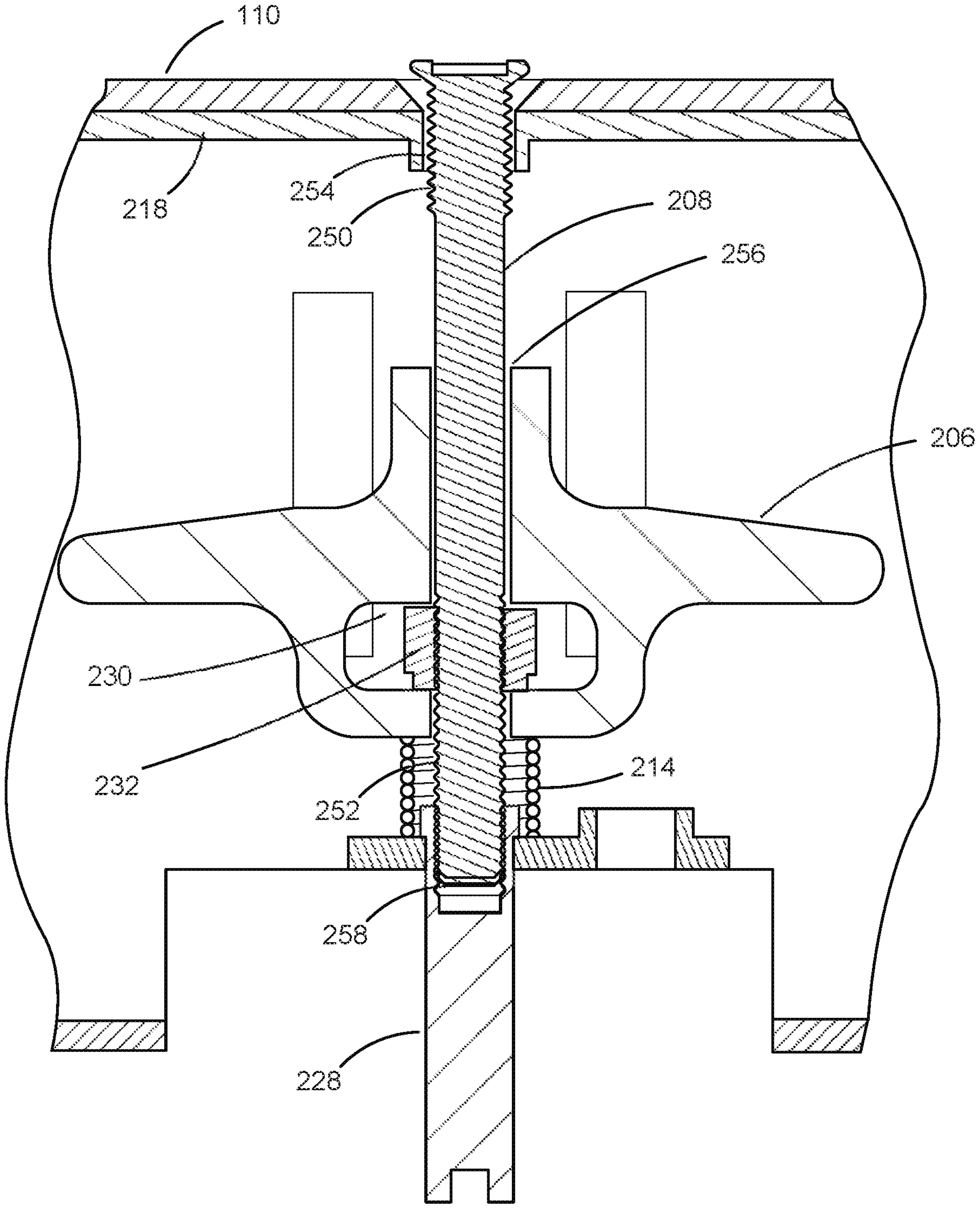
FIG. 6 is partial cross-section view of the mounting mechanism.

With reference to FIG. 6, the plunger 208 includes first and second threaded portions 250 and 252, respectively. In some embodiments, the first threaded portion 250 is larger than the second 252. For example, in some embodiments, the first threaded portion 250 can be an M3 thread and the second portion 252 can be an M2 thread. When the plunger 208 is in the latched position, as shown, the first threaded portion 252 is positioned to engage mating threads 254 disposed in the bracket flange 218, thereby retaining the mechanism in the latched position. The plunger 208 extends through a clearance hole 256 formed through the link 206 and the second threaded portion 252 engages the self-locking nut 232 retained in opening 230. The self-locking nut 232 is constrained in opening 230 to prevent plunger 208 from being removed through the front panel 110. The guide pin 228 includes female threads 258 that mate with the second threaded portion 252. The guide pin 228 helps align the plunger 208 and spring 214 along the same vertical axis. It can be understood from the figure that the self-locking nut 232 as well as plunger 208 can rotate freely with respect to the link 206. Accordingly, as the plunger 208 is moved to the latched position and threads 250 are engaged with mating threads 254, the self-locking nut 232 pushes the link 206 away from the front panel 110 causing the latches 204 to pivot and engage the sidewalls 106 of the housing 102 (FIG. 3B).

Figure 7:
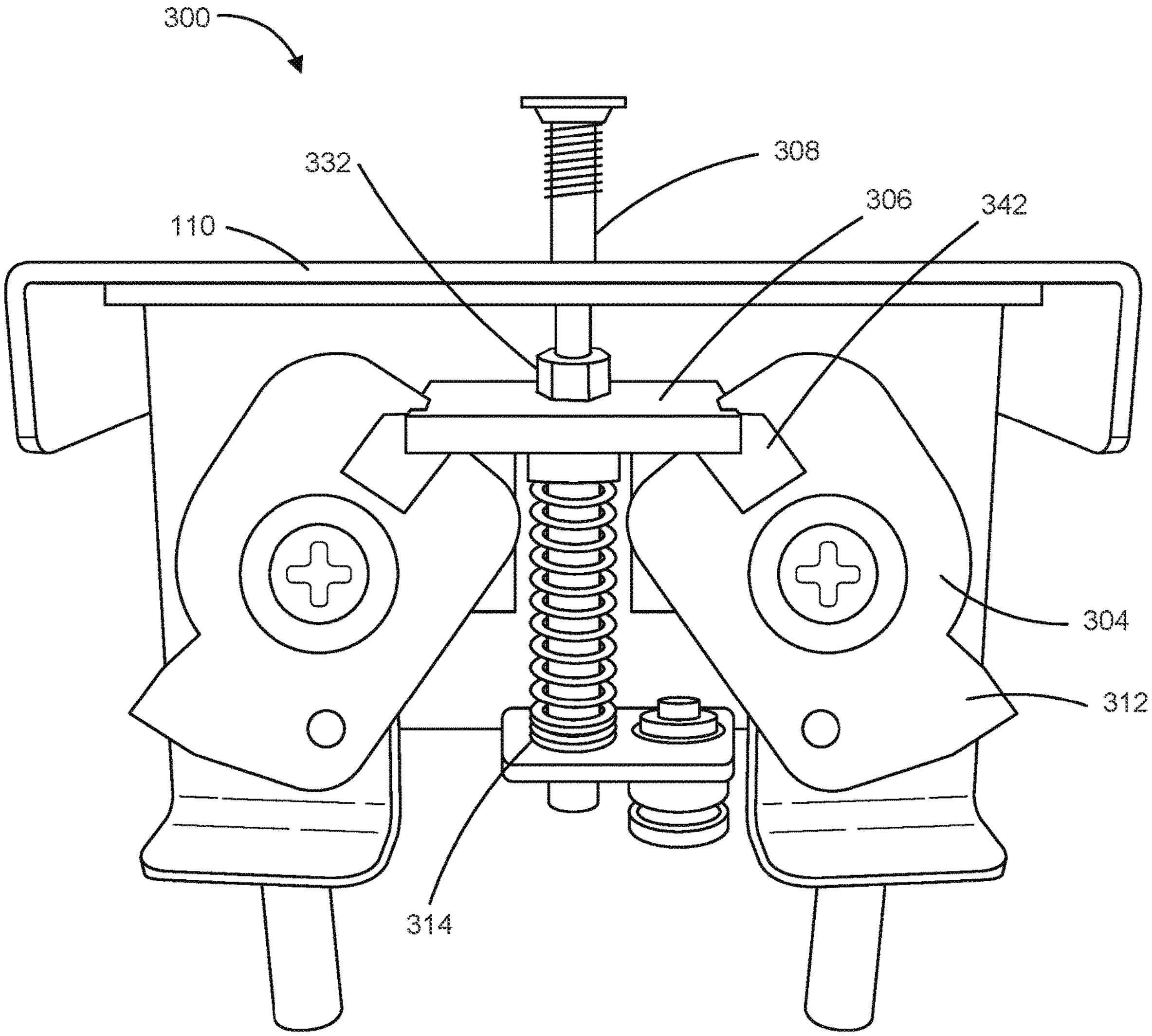
FIG. 7 is a front view of a mounting mechanism according to some embodiments of the disclosed technology.

FIG. 7 illustrates a mounting mechanism 300 according to some embodiments of the disclosed technology. The mounting mechanism 300 includes some components having features similar to those described above with respect to mounting mechanism 200. However, some components are different as shown in the figure. For example, the link 306 comprises a bar that is positioned on the plunger 308 and the self-locking nut 332 is mated with the plunger 308 on top of the link 306 such that when the plunger is pushed down the self-locking nut 332 pushes the link 306 away from the front panel 110. The latches 304 include open ended slots 342 that pivotably engage end portions of the link 306.

When the plunger 308 is moved to the released position, as shown, the spring 314 moves the link 306 toward the front panel 110. As the link 306 moves toward the front panel 110 the distal end portions 312 of the latches 304 each move (e.g., pivot) away from the front panel 110 such that they are disengaged from the corresponding sidewall. Conversely, when the plunger 308 is moved to the latched position the plunger 308 and self-locking nut 332 moves the link 306 away from the front panel 110 such that the end portions of the link 306 push down on the open ended slots 342 of the latches 304 causing the distal end portions 312 of the latches 304 to move (e.g., pivot) toward the front panel 110 to engage a corresponding sidewall of the housing.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention. It will be noted that various advantages described herein are not exhaustive or exclusive, and numerous different advantages and efficiencies may be achieved, as will be recognized by one of skill in the art.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

We claim:

1. An outlet module mounting mechanism for use with a power distribution unit (PDU) having an associated PDU housing, said outlet module mounting mechanism comprising:

a bracket attachable to an outlet module;

at least one latch movably coupled to the bracket, wherein said at least one latch has a proximal end portion and a distal end portion;

a link movably coupled to the proximal end portion of said at least one latch; and a plunger connected to the link and movable between a released position and a latched position, wherein when the plunger is moved to the latched position the plunger moves the link away from a front side of the outlet module such that the distal end portion of the at least one latch moves toward the front side of the outlet module to engage a corresponding wall of the associated PDU housing thereby securing the outlet module to the associated PDU housing, and when the plunger is moved to the released position the plunger moves the link toward the front side of the outlet module such that the distal end portion of the at least one latch moves away from the front side of the outlet module to disengage the corresponding wall thereby releasing the outlet module from the associated PDU housing and allowing removal of the outlet module from the PDU.

2. The outlet module mounting mechanism of claim 1, wherein the at least one latch comprises a pair of latches each pivotably coupled to the bracket, and wherein the link is positioned between the pair of latches and pivotably coupled to the proximal end portion of each of the latches.

3. The outlet module mounting mechanism of claim 2, wherein the proximal end portion of each latch includes a slot and the link includes a pair of pins each configured to engage the slot of a corresponding latch.

4. The outlet module mounting mechanism of claim 1, wherein when the plunger is moved to the latched position the plunger moves the link away from a front panel of the outlet module such that the distal end portion of the at least one latch moves toward the front panel, and when the plunger is moved to the released position the plunger moves the link toward the front panel such that the distal end portion of the at least one latch moves away from the front panel.

5. The outlet module mounting mechanism of claim 1, wherein the at least one latch pivots about a corresponding pivot pin attached to the bracket.

6. The outlet module mounting mechanism of claim 1, wherein the bracket includes a pair of guide slots and the link includes a pair of guide features slidably mated with the guide slots.

7. An outlet module for use with a power distribution unit (PDU) having an associated PDU housing, the outlet module comprising:
- an outlet module panel;
- multiple outlets carried by the outlet module panel; and
- at least one outlet module mounting mechanism, comprising:
  - at least one latch having a proximal end portion and a distal end portion; and
  - an actuator linked to the at least one latch and movable between a released position and a latched position,
  - wherein when the actuator is moved to the latched position the actuator causes the distal end portion of the at least one latch to move toward the outlet module panel to engage a corresponding wall of the associated PDU housing thereby securing the outlet module to the associated PDU housing, and
  - when the actuator is moved to the released position the actuator causes the distal end portion of the at least one latch to move away from the outlet module panel and disengage the corresponding wall thereby releasing the outlet module from the associated PDU housing and allowing removal of the outlet module from the PDU.

8. The outlet module of claim 7, wherein the at least one outlet module mounting mechanism further comprises a bracket attached to the outlet module panel and wherein the at least one latch comprises a pair of latches each pivotably coupled to the bracket.

9. The outlet module of claim 8, wherein the at least one outlet module mounting mechanism further comprises a link connected to the actuator and pivotably coupled to the proximal end portion of each of the latches.

10. The outlet module of claim 9, wherein the proximal end portion of each latch includes a slot and the link includes a pair of pins each configured to engage the slot of a corresponding latch.

11. The outlet module of claim 9, wherein the bracket includes a pair of guide slots and the link includes a pair of guide features slidably mated with the guide slots.

12. A power distribution unit, comprising:
- a housing; and
- at least one outlet module located at least partially within the housing, the at least one outlet module comprising:
  - an outlet module panel mated to the housing;
  - multiple outlets carried by the outlet module panel; and
  - at least one outlet module mounting mechanism, comprising:
    - at least one latch having a proximal end portion and a distal end portion; and
    - an actuator linked to the at least one latch and movable between a released position and a latched position,
    - wherein when the actuator is moved to the latched position the actuator causes the distal end portion of the at least one latch to move toward the outlet module panel to engage a corresponding wall of the housing thereby securing the at least one outlet module to the housing, and
  - when the actuator is moved to the released position the actuator causes the distal end portion of the at least one latch to move away from the outlet module panel to disengage the corresponding sidewall thereby releasing the at least one outlet module from the housing and allowing removal of the at least one outlet module from the housing.

13. The power distribution unit of claim 12, wherein the housing comprises longitudinally extending rails against which the at least one latch engages the corresponding wall of the housing.

14. The power distribution unit of claim 13, wherein each rail includes a groove extending along its length, and wherein the outlet module panel includes flanges that engage a corresponding groove.

15. The power distribution unit of claim 12, wherein the at least one outlet module mounting mechanism further comprises a bracket attached to the outlet module panel and wherein the at least one latch comprises a pair of latches each pivotably coupled to the bracket.

16. The power distribution unit of claim 15, wherein the at least one outlet module mounting mechanism further comprises a link connected to the actuator and pivotably coupled to the proximal end portion of each of the latches.

17. The power distribution unit of claim 16, wherein the proximal end portion of each latch includes a slot and the link includes a pair of pins each configured to engage the slot of the at least one latch.

18. An outlet module mounting mechanism for use with a power distribution unit (PDU) having an associated PDU housing, said outlet module mounting mechanism comprising:
- a bracket attachable to an outlet module;
- a pair of latches each pivotably coupled to the bracket, wherein each latch of the pair of latches has a proximal end portion and a distal end portion, and wherein the proximal end portion of each latch comprises a clevis defining a slot;
- a link positioned between the pair of latches, the link including a pair of pins each configured to engage the slot of a corresponding latch of the pair of latches, whereby the link is pivotably coupled to the clevis of each of the latches of the pair of latches; and
- a plunger connected to the link and movable between a released position and a latched position,
  - wherein when the plunger is moved to the latched position the plunger moves the link away from a front side of the outlet module such that the distal end portion of each latch of the pair of latches moves toward the front side of the outlet module to engage a corresponding wall of the associated PDU housing thereby securing the outlet module to the associated PDU housing, and
  - when the plunger is moved to the released position the plunger moves the link toward the front side of the outlet module such that the distal end portion of each latch of the pair of latches moves away from the front side of the outlet module to disengage the corresponding wall thereby releasing the outlet module from the associated PDU housing and allowing removal of the outlet module from the PDU.

19. An outlet module mounting mechanism for use with a power distribution unit (PDU) having an associated PDU housing, said outlet module mounting mechanism comprising:

a bracket attachable to an outlet module;

at least one latch movably coupled to the bracket, wherein said at least one latch has a proximal end portion and a distal end portion;

a link movably coupled to the proximal end portion of said at least one latch; and a plunger comprising a first threaded portion and a second threaded portion, wherein the first threaded portion engages mating threads disposed in the bracket, and wherein the plunger extends through the link and the second threaded portion engages a mating fastener retained in the link, whereby the plunger is connected to the link and movable between a released position and a latched position, wherein when the plunger is moved to the latched position the plunger moves the link away from a front side of the outlet module such that the distal end portion of the at least one latch moves toward the front side of the outlet module to engage a corresponding wall of the associated PDU housing thereby securing the outlet module to the associated PDU housing, and when the plunger is moved to the released position the plunger moves the link toward the front side of the outlet module such that the distal end portion of the at least one latch moves away from the front side of the outlet module to disengage the corresponding wall thereby releasing the outlet module from the associated PDU housing and allowing removal of the outlet module from the PDU.

20. The outlet module mounting mechanism of claim 19, further comprising a guide pin extending through a portion of the bracket and engaged with the second threaded portion, and a resilient member positioned between the link and the portion of the bracket.

21. An outlet module mounting mechanism for use with a power distribution unit (PDU) having an associated PDU housing, said outlet module mounting mechanism comprising:

a bracket attachable to an outlet module, the bracket comprising one or more posts positioned to support a printed circuit board;

at least one latch movably coupled to the bracket, wherein said at least one latch has a proximal end portion and a distal end portion;

a link movably coupled to the proximal end portion of said at least one latch; and a plunger connected to the link and movable between a released position and a latched position, wherein when the plunger is moved to the latched position the plunger moves the link away from a front side of the outlet module such that the distal end portion of the at least one latch moves toward the front side of the outlet module to engage a corresponding wall of the associated PDU housing thereby securing the outlet module to the associated PDU housing, and when the plunger is moved to the released position the plunger moves the link toward the front side of the outlet module such that the distal end portion of the at least one latch moves away from the front side of the outlet module to disengage the corresponding wall thereby releasing the outlet module from the associated PDU housing and allowing removal of the outlet module from the PDU.

22. An outlet module for use with a power distribution unit (PDU) having an associated PDU housing, the outlet module comprising:

an outlet module panel;

multiple outlets carried by the outlet module panel; and at least one outlet module mounting mechanism, comprising:

a bracket attached to the outlet module panel;

a pair of latches each pivotably coupled to the bracket, wherein each latch of the pair of latches has a proximal end portion and a distal end portion;

an actuator linked, with a link, to each latch of the pair of latches and movable between a released position and a latched position, the actuator comprising a plunger including a first threaded portion and a second threaded portion, wherein the first threaded portion engages mating threads disposed in the bracket, and wherein the plunger extends through the link and the second threaded portion engages a mating fastener retained in the link, and the link connected to the actuator and pivotably coupled to the proximal end portion of each of the latches of the pair of latches;

wherein when the actuator is moved to the latched position the actuator causes the distal end portion of each latch of the pair of latches to move toward the outlet module panel to engage a corresponding wall of the associated PDU housing thereby securing the outlet module to the associated PDU housing, and when the actuator is moved to the released position the actuator causes the distal end portion of each latch of the pair of latches to move away from the outlet module panel and disengage the corresponding wall thereby releasing the outlet module from the associated PDU housing and allowing removal of the outlet module from the PDU.

23. The outlet module of claim 22, further comprising a guide pin extending through a portion of the bracket and engaged with the second threaded portion.

24. The outlet module of claim 22, further comprising a printed circuit board, and wherein the bracket includes one or more posts positioned to support the printed circuit board.

25. A power distribution unit, comprising:

a housing; and at least one outlet module located at least partially within the housing, the at least one outlet module comprising:

an outlet module panel mated to the housing;

multiple outlets carried by the outlet module panel; and at least one outlet module mounting mechanism, comprising:

a bracket attached to the outlet module panel;

a pair of latches each pivotably coupled to the bracket, wherein each latch of the pair of latches has a proximal end portion and a distal end portion;

an actuator linked, with a link, to each latch of the pair of latches and movable between a released position and a latched position, the actuator comprises a plunger including a first threaded portion and a second threaded portion, wherein the first threaded portion engages mating threads disposed in the bracket, and wherein the plunger extends through the link and the second threaded portion engages a mating fastener retained in the link; and the link connected to the actuator and pivotably coupled to the proximal end portion of each of the latches of the pair of latches, wherein when the actuator is moved to the latched position the actuator causes the distal end portion of each latch of the pair of latches to move toward the outlet module panel to engage a corresponding wall of the housing thereby securing the at least one outlet module to the housing, and when the actuator is moved to the released position the actuator causes the distal end portion of each latch of the pair of latches to move away from the outlet module panel to disengage the corresponding wall thereby releasing the at least one outlet module from the housing and allowing removal of the at least one outlet module from the housing.

26. The power distribution unit of claim 25, further comprising a guide pin extending through a portion of the bracket and engaged with the second threaded portion, and a resilient member positioned around the guide pin and between the link and the portion of the bracket.

* * * * *